United States Patent
Sharad et al.

(10) Patent No.: US 12,049,279 B2
(45) Date of Patent: Jul. 30, 2024

(54) VEHICLE STABILISING SYSTEM AND METHOD OF OPERATION THEREOF

(71) Applicant: TVS MOTOR COMPANY LIMITED, Chennai (IN)

(72) Inventors: Singhania Sharad, Chennai (IN); Raju Karnam Venkata Manga, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 169 days.

(21) Appl. No.: 17/436,295

(22) PCT Filed: Mar. 15, 2020

(86) PCT No.: PCT/IN2020/050235
§ 371 (c)(1),
(2) Date: Sep. 3, 2021

(87) PCT Pub. No.: WO2020/188595
PCT Pub. Date: Sep. 24, 2020

(65) Prior Publication Data
US 2022/0177069 A1 Jun. 9, 2022

(30) Foreign Application Priority Data
Mar. 15, 2019 (IN) .............................. 201941010133
Mar. 13, 2020 (IN) .............................. 202042010983

(51) Int. Cl.
*B62J 45/00* (2020.01)
*B62J 27/00* (2020.01)
(Continued)

(52) U.S. Cl.
CPC .............. *B62K 21/00* (2013.01); *B62J 27/00* (2013.01); *B62J 45/411* (2020.02); *B62J 45/412* (2020.02);
(Continued)

(58) Field of Classification Search
CPC ...... B62K 21/00; B62K 2202/00; B62K 5/10; B62J 45/412; B62J 45/411; B62J 45/4151; B62J 27/00
(Continued)

(56) References Cited

U.S. PATENT DOCUMENTS

2015/0105938 A1* 4/2015 Seki ........................ B62K 11/04
701/1
2017/0327109 A1* 11/2017 Watanabe ............... F02B 61/02

OTHER PUBLICATIONS

International Search Report issued in corresponding International Application No. PCT/IN2020/050235, dated Sep. 8, 2020 (5 pages).
(Continued)

*Primary Examiner* — Tiffany P Ohman
(74) *Attorney, Agent, or Firm* — Osha Bergman Watanabe & Burton LLP

(57) ABSTRACT

A system includes: sensors that includes a position sensor to determine a vehicle speed, an angular displacement sensor to determine a roll angle corresponding to an angular displacement of the vehicle in a roll direction and a roll rate corresponding to an angular velocity of the vehicle in the roll direction, and a steering torque sensor to determine a steering torque applied to a steering handle of the vehicle; and a stabilizing unit coupled to the sensors. The stabilizing unit: determines a synthesized torque based on the roll angle, the roll rate, and the vehicle speed; determines a tuning parameter based on a comparison of the synthesized torque and the steering torque; determines a stabilizing torque based on the tuning parameter and the synthesized torque; and provides an actuating signal corresponding to the stabilizing torque for applying the stabilizing torque to the steering handle of the vehicle.

34 Claims, 7 Drawing Sheets

(51) Int. Cl.
   *B62J 45/411* (2020.01)
   *B62J 45/412* (2020.01)
   *B62J 45/415* (2020.01)
   *B62K 5/10* (2013.01)
   *B62K 21/00* (2006.01)

(52) U.S. Cl.
   CPC ............. *B62J 45/4151* (2020.02); *B62K 5/10* (2013.01); *B62K 2202/00* (2013.01)

(58) Field of Classification Search
   USPC .......................................................... 701/41
   See application file for complete search history.

(56) References Cited

OTHER PUBLICATIONS

Written Opinion issued in corresponding International Application No. PCT/IN2020/050235, dated Sep. 8, 2020 (9 pages).

* cited by examiner

VEHICLE STABILISING SYSTEM AND METHOD OF OPERATION THEREOF

TECHNICAL FIELD

The present subject matter described herein generally relates to vehicle stabilizing systems and to methods of operation thereof.

BACKGROUND

Saddle riding type vehicles including two-wheeled and three-wheeled vehicles are steered by operating a steering handle so as to turn a front fork supporting a front wheel around a steering stem/shaft. Typically, the vehicles are steered by steering forces exerted by the rider on the steering handle. High steering forces are especially required to be applied while manoeuvring at very low speeds. For example, in slow moving traffic conditions, the rider is typically forced to ride at very slow speeds and is often forced to stop intermittently and start again. In such conditions it becomes extremely difficult for a rider to balance the vehicle as the vehicle loses its stability at very low speeds. It therefore becomes challenging for the rider, especially beginners to balance the vehicle. Additionally, vehicles with single track of wheels, for example, a two-wheeled vehicle, have a potential risk of falling often, which is also referred to as capsize failure. When the vehicle loses stability, the rider especially beginners automatically tend to make rapid steering movements and apply greater steering torque resulting in the rider experiencing fatigue. The riders also typically find it difficult to balance the vehicle when they encounter road bumps and potholes. Further, in some riding conditions involving sharp curves, high steering forces are also required. In order to balance the vehicle in such conditions, the rider typically applies rapid steering movements to the steering handle, and sometimes falls along with the vehicle while doing so. Therefore, systems for assisting the rider that may help balance the vehicle are being researched and developed.

In recent times, rider-less vehicles, i.e., vehicles that are provided with self-driving and self-balancing capabilities and do not need a rider to control or steer the vehicle, are also being developed. In such vehicles also, balancing the vehicles is a challenge, particularly at low speeds.

A known art describes a steering support system for a two-wheeler which provides additional steering forces to support the steering forces applied by the rider, so that he may be able to balance the vehicle appropriately. However, the application of the additional steering forces by the steering support system involves the determination of a number of dynamic vehicle parameters, such as steering angle, instantaneous steering torque applied by rider, instantaneous acceleration of the entire vehicle or only of certain components of the vehicle. For example, yaw rate sensors, roll rate sensors or acceleration sensors may be used to detect transverse accelerations, longitudinal accelerations and/or vertical accelerations. As a result, the steering support system uses a plurality of sensors, such as force sensors, acceleration sensors, etc. Further, the support system also makes use of other vehicle dynamic parameters, such as control signals from an anti-lock brake system, etc. for ascertaining the amount of torque to be applied to the actuator.

Also, conventional systems used for balancing the vehicle involve the use of yaw rate parameters for determining the stabilizing torque/balancing torque to be applied. However, yaw rate parameters have lower lead time with respect to steering torque. Availability of a small lead time for the application of balancing torque may hamper rider intervention which may be required for making any manoeuvres during the course of riding.

Using a number of vehicle dynamic parameters for determining the additional steering torque required to balance the vehicle tends to affect the accuracy and precision of calculation of the required additional steering torque under various vehicle riding conditions, as well as is a complex and cost intensive proposition. Moreover, the number of sensors used for determining the additional steering torque required also results in increased cost of product, higher assembly time as well as complex manufacturing cum assembly.

Moreover, in some other known arts it has been attempted to balance a two-wheeled vehicle by giving minimal significance to the interaction between a two-wheeler and a rider during different riding conditions. However, it is important to factor in such an interaction in order to understand the comfort/discomfort being experienced/felt by the rider when the vehicle is steered/controlled by an additional/supporting steering stabilizing system.

SUMMARY

This summary is provided to introduce concepts related to vehicle stabilization, which are further described below in the detailed description. This summary is not intended to identify essential features of the claimed subject matter nor is it intended for use in determining or limiting the scope of the claimed subject matter.

The present subject matter provides systems and methods for improving stability of the vehicle at different vehicle speeds including very low vehicle speeds and under different riding conditions, especially for saddle riding type vehicles.

In one example, the system comprises a plurality of sensors, wherein the plurality of sensors comprises a position sensor to determine a vehicle speed (v) and an angular displacement sensor to determine a roll angle ($\phi$) and a roll rate ($\dot{\phi}$) of the vehicle, the roll angle ($\phi$) corresponding to an angular displacement of the vehicle in a roll direction and the roll rate ($\dot{\phi}$) corresponding to an angular velocity of the vehicle in the roll direction. The system further comprises a stabilizing unit to provide an actuating signal to an actuator, the actuating signal corresponding to a stabilizing torque ($T_s$) to be applied to a steering handle of the vehicle by the actuator for stabilizing the vehicle, wherein the stabilizing unit is coupled to the plurality of sensors. The stabilizing unit is to determine gain values ($G_1$, $G_2$) for the roll angle ($\phi$) and the roll rate ($\dot{\phi}$) respectively based on the vehicle speed (v); and determine the stabilizing torque ($T_s$) based on application of respective gain values ($G_1$, $G_2$) to the roll angle ($\phi$) and the roll rate ($\dot{\phi}$).

In another example, the system comprises a plurality of sensors, wherein the plurality of sensors comprises a position sensor to determine a vehicle speed (v), an angular displacement sensor to determine a roll angle ($\phi$) corresponding to an angular displacement of the vehicle in a roll direction and a roll rate ($\dot{\phi}$) corresponding to an angular velocity of the vehicle in the roll direction, and a steering torque sensor to determine a steering torque ($T_r$) applied to a steering handle of the vehicle. The system further comprises a stabilizing unit coupled to the plurality of sensors, wherein the stabilizing unit is to: determine a synthesized torque based on the roll angle ($\phi$), the roll rate ($\dot{\phi}$), and the vehicle speed (v); determine a tuning parameter based on a comparison of the synthesized torque and the steering torque ($T_r$); determine a stabilizing torque ($T_s$) based on the tuning parameter and the synthesized torque; and provide, to an actuator, an actuating signal corresponding to the stabilizing torque ($T_s$) for applying the stabilizing torque ($T_s$) to the steering handle of the vehicle for stabilizing the vehicle.

In various examples, methods for vehicle stabilization are also discussed based on determination of stabilizing torque from a synthesized torque, which is in turn determined based on roll parameters and vehicle speed.

BRIEF DESCRIPTION OF DRAWINGS

The detailed description of the present subject matter is described with reference to the accompanying figures. Same numbers are used throughout the drawings to reference like features and components.

DETAILED DESCRIPTION

Figure 1:
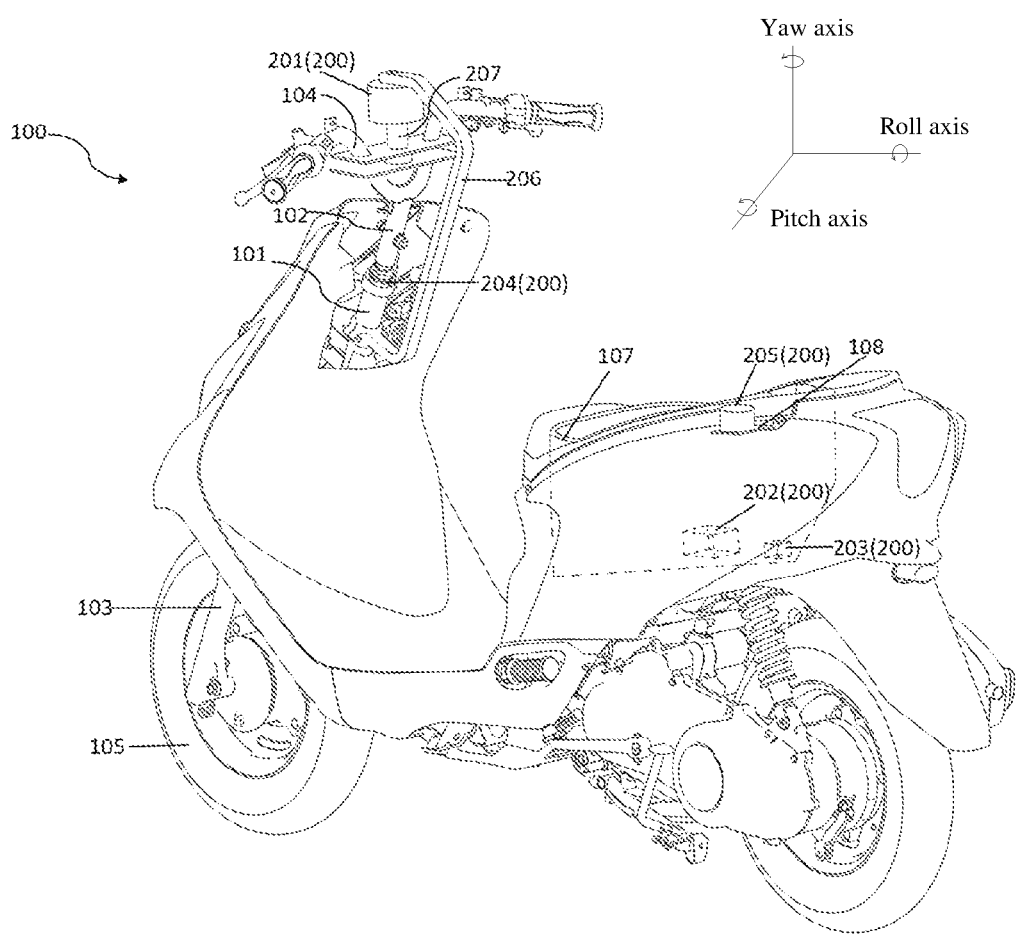
FIG. 1 illustrates an example saddle riding type vehicle including a system for vehicle stabilization, in accordance with an implementation of the present subject matter.

The present subject matter relates to vehicle stabilizing systems and methods for improving stability of a saddle riding type vehicle under various riding conditions, and specially at very low speeds. It helps in ensuring ease of manoeuvrability of the vehicle, riding comfort, and rider safety at different vehicle speeds including extremely low vehicle speeds. The systems and methods are capable of providing accurate and precise steering support to the vehicle without interfering with the steering intent of the rider. Further, the systems and methods are capable of mimicking a steering action/input of a rider while balancing the vehicle. Moreover, the implementations of the present subject matter are simple and economical to manufacture, install, and operate. Thus, the present subject matter also helps in optimizing cost of manufacturing a vehicle which employs a stabilizing system.

While aspects of the present subject matter are discussed with reference to a rider operating the vehicle as an example, it will be understood that the principles of the present subject matter may apply to rider-less vehicles also, where a vehicle controller may manoeuvre or navigate the vehicle instead of the rider. Accordingly, the stabilizing systems and methods can assist the vehicle controller to maintain stability and improve safety and manoeuvrability in a manner similar to assisting a rider.

As per an aspect of the present subject matter, the system employs a steering handle (handlebar) for mechanically supporting the movement of the vehicle, an actuator for applying driving/balancing force to the steering handle based on a stabilizing torque ($T_s$), which in turn is obtained from a synthesized torque (T) determined by a stabilizing unit. In an example, the synthesized torque (T) is determined from a first synthesized torque ($T_1$), which is determined based on roll angle and roll rate measured by an inertial measurement unit. The first synthesized torque ($T_1$) may be determined by multiplying respective gain values to roll angle ($\phi$) and roll rate ($\dot{\phi}$) measured by an angular displacement sensor, followed by adding the products.

The gain values may be derived from experiments by statistical analysis and may be obtained as a function of vehicle speed (v), vehicle specification, and delay time. Specifically, the delay time being referred to herein is the time difference for the second (trailing) dynamic parameter by which it is lagging the first (leading) dynamic parameter and the same is measured in seconds. For example, in case of any manoeuvre at low speeds when vehicle tends to roll due to instability, the rider provides a steering torque to balance, which results in balancing of the vehicle. As may be appreciated, the dynamic parameter 'steering torque' will have a delay time with 'roll angle', which is one of the dynamic parameters obtained when vehicle rolls.

Thus, while determining the synthesized torque (T), the stabilizing unit takes into consideration vehicle speed (v) which is used to determine gain values ($G_1$ and $G_2$). General vehicle parameters such as vehicle layout, mass inertia and its distribution, sub-system properties etc. also influence the synthesized torque (T) and may be considered. In one example, the first synthesized torque ($T_1$) may be the synthesized torque (T) that is applied for stabilizing the vehicle.

In another example, the stabilizing unit is configured to determine a lead time ($\tau$) with which the first synthesized torque ($T_1$) is to be applied and to factor in the lead time to obtain a second synthesized torque ($T_2$) as the synthesized torque (T). Typically, the lead time ($\tau$) chosen for application of the first synthesized torque ($T_1$) is such that the point of application of the synthesized torque (T) precedes a usual rider steering operation point. The lead time ($\tau$) thus chosen for application of the synthesized torque (T) helps in improving a rider's confidence level with the vehicle, even while being assisted for balancing especially at low vehicle speeds.

In one example, the synthesized torque (T) may be applied as a stabilizing torque ($T_s$) for stabilizing the vehicle. In another example, the stabilizing torque ($T_s$) may be determined based on a comparison of the synthesized torque (T) and a steering input/torque ($T_r$), which is typically measured by a steering torque sensor provided in the vehicle. Further, the stabilizing unit may determine the stabilizing torque ($T_s$) to be applied to the steering handle based on a determination of different riding conditions from the steering torque ($T_r$) and a corresponding tuning parameter. The tuning parameter may lie in a range of 0 to 1 depending on the riding condition and may be varied gradually for enhanced rider comfort and safety.

In one example, in a condition where the rider is momentarily changing the steering torque, for example, for steering the vehicle during a lane change or overtaking another vehicle or avoiding a pothole, the synthesized torque (T) is typically found to be not equal to the steering torque ($T_r$), as the steering torque ($T_r$) applied keeps changing continuously. Therefore, the difference between the synthesized torque (T) and the steering torque ($T_r$) is found to be not equal to zero. In such a condition, the stabilizing torque ($T_s$) to be applied by the actuator to ensure that the vehicle remains balanced is calculated by multiplying the synthesized torque (T) with a first tuning parameter 'A' stored in the stabilizing unit. The first tuning parameter is predetermined as a function of vehicle speed (v), rider behaviour, and vehicle specification, which includes vehicle layout, mass distribution and inertia.

In another example, when the vehicle is cornering, a constant steering torque ($T_r$) may be applied by the rider. The stabilizing unit can provide accurate and precise steering support to the vehicle during cornering by subjecting the steering handle with a stabilizing torque ($T_s$) determined based on comparison of the synthesised torque (T) with rider steering input/torque ($T_r$), and further multiplying the synthesized stabilizing torque ($T_1$) with a second tuning parameter B' stored in the stabilizing unit. The second tuning parameter B may also be predetermined as a function of vehicle speed (v) and radius of turning.

In yet another example, when the vehicle is cruising, the rider may not apply a steering torque ($T_r$), except for balancing. In such a case, the steering torque ($T_r$) is essentially zero and constant and the stabilizing unit can apply the synthesized torque (T) as the stabilizing torque ($T_s$), i.e., use a tuning parameter of 1. As the stabilizing unit applies the balancing torque, the rider need not apply even the balancing torque and thus rider comfort may be further improved.

The system as per the principles of the present subject matter thus aids in balancing the vehicle by pre-empting application of a stabilizing torque ($T_s$) under various riding conditions, without interfering with a steering intent of the rider/vehicle controller. Moreover, since roll parameters such as roll rate and roll angle are used for determining the synthesized torque (T), it is found that the lead time available for application of the stabilizing torque is sufficient to be able to apply the stabilizing torque in less time than the response time taken by a rider in making steering corrections to balance the vehicle at low speeds. Therefore, the stabilizing system in a way mimics the rider in balancing the vehicle, while also ensuring that the rider has to put in minimal effort for balancing the vehicle and can feel confident while riding the vehicle under different riding conditions, and especially at low speeds.

The present subject matter is further described with reference to the appended figures. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates an example saddle riding type vehicle 100 employing a system 200 for stabilizing the vehicle 100. The saddle riding type vehicle 100 comprises a head tube 101, a main tube (not shown) extending rearwardly and downwardly from the head tube 101. As will be understood, the head tube 101 and the main tube form parts of a body frame of the saddle type vehicle. A steering system of the vehicle comprises a steering shaft 102, a pair of front forks 103 and a steering handle 104. The steering shaft 102 is connected to the head tube 101 and has one end fixedly mounted with the steering handle 104 such that it has a revolute joint with the head tube 101. Particularly, the pair of front forks 103 and the steering handle 104 rotatably support a front wheel 105 through the steering shaft 102. The steering handle 104 serves as a means for a rider to mechanically stabilise the movement of the vehicle.

The saddle riding type vehicle 100 is provided with a system 200 for aiding in balancing the vehicle 100 at different vehicle speeds and under different riding conditions. The system 200 may include a stabilizing unit 202 and a plurality of sensors communicatively coupled to the stabilizing unit 202. The stabilizing unit 202 may be, for example, a controller. The system 200 interacts with, and in some examples may comprise, an actuator 201 which is connected to the steering handle 104 such that the actuator 201 is capable of rotating the steering handle 104 about the steering axis. For example, the actuator 201 may either be directly connected to the steering system along the steering axis or indirectly connected through a linkage member to the steering system, wherein weight and dimensions of the linkage member would form part of the vehicle specification. Use of a linkage member for connecting the actuator 201 to the steering system may help in reducing weight and cost of the actuator and may also help in ease of assembly and maintenance.

In one example, the actuator 201 may be a motor and may be connected to a rotating shaft 207, which is secured to the steering handle 104. Further, a motor fixture 206 may be used to fixedly link the actuator 201 to the head tube 101. Use of the motor fixture 206 for securing the actuator 201 may help in reducing weight of the actuator 201. Additionally, mounting the actuator 201 above the steering handle 104 may also help in saving space. The actuator 201 may be configured to apply a stabilizing torque ($T_s$) to the steering handle for balancing/supporting the vehicle 100 at different speeds and different riding conditions on receiving an actuating signal.

The actuator 201 may receive the actuating signal from the stabilizing unit 202 of the system 200. In one example, the stabilizing unit 202 may be located on the main tube (not shown) of the vehicle. However, the stabilizing unit 202 may also be disposed elsewhere on the frame of the vehicle 100. In one example, as shown in the figure, the stabilizing unit 202 may be disposed within a utility box 107 of the vehicle 100.

In an implementation, the stabilizing unit 202 may include one or more processors/processing units and one or more memories. For example, the stabilizing unit 202 may comprise a first processing unit and a second processing unit that may be communicatively coupled to each other. In one example, the first processing unit and the second processing unit may be disposed at the same location in the vehicle 100, such as in the utility box. In another example, the first and second processing units may be disposed at different locations in the vehicle 100. For example, the first processing unit may be disposed in the utility box and the second processing unit may be disposed proximal to the steering handle 104 or actuator 201.

The stabilizing unit 202 may be communicatively connected to a plurality of sensors for receiving dynamic vehicle inputs such as vehicle speed, vehicle state, angular displacement inputs in a roll direction of the vehicle, such as roll angle and roll rate, steering torque and angle, etc.

In one example, the plurality of sensors may include an inertial measurement unit (IMU) as an angular displacement sensor 203, a steering torque sensor 204 and a position sensor 205. In one example, the angular displacement sensor 203 may also be disposed at the utility box and may detect the angular displacement of the vehicle in roll direction (i.e., roll angle) and angular velocity of the vehicle in roll direction (i.e., roll rate). In other examples, the angular displacement sensor 203 may be disposed at other locations on the vehicle 100. The angular displacement sensor 203 may supply the input signals corresponding to the roll angle and roll rate to the stabilizing unit 202. The position sensor 205 may be a global positioning system (GPS) based sensor.

In one example, the position sensor 205 may be disposed on an outward extension member 108 extending outwardly from the utility box 107, however, the position sensor 205 may be disposed at other locations on the vehicle 100 also as will be understood.

The position sensor 205 can provide signals corresponding to a speed of the vehicle and also signals relating to an instantaneous state of the vehicle to the stabilizing unit 202. The instantaneous state is the translational and angular (roll, pitch, yaw) position of the motorcycle at that instant, which will change next instant when the vehicle moves as state of the vehicle (roll angle, roll rate in this case) changes continuously with movement of the vehicle. The torque provided at a next instant of time is decided based on the instantaneous state at a present moment.

The steering torque sensor 204 may sense and provide an input corresponding to the force or torque with which a rider turns the steering handle 104 in the steering direction. For this, the steering torque sensor may be disposed on the steering shaft 102. In one example, the inputs from the angular displacement sensor 203 and the position sensor 205 may be received by the first processing unit of the stabilizing unit 202, while the input from the steering torque sensor 204 may be received by the second processing unit along with an output from the first processing unit.

Based on the signals generated by the above-mentioned sensors, which provide information regarding vehicle dynamic parameters, the stabilizing unit 202 may determine a stabilizing torque ($T_s$) for balancing the vehicle. In particular, in the present subject matter, roll parameters, such as roll angle and roll rate, are considered over yaw parameters in order to arrive at a synthesized torque (T), from which the stabilizing torque ($T_s$) may be obtained for stabilizing the vehicle. As is understood and shown in FIG. 1, roll axis corresponds to the longitudinal axis of the vehicle, yaw axis corresponds to the vertical axis of the vehicle and pitch axis corresponds to the lateral axis of the vehicle. Thus, the roll angle and roll rate correspond to the angular displacement and angular velocity about the roll axis. Typically, the measurement of roll parameters is faster than of the yaw parameters. By using roll parameters, the delay associated with use of yaw parameter(s) is eliminated. As per an aspect of the present subject matter, the synthesized torque (T) is synthesized based on roll angle and roll rate measured by the angular displacement sensor 203 using coefficients determined based on regression analysis of experimental data.

The synthesized torque (T) may also account for delay time in application of the stabilizing torque ($T_s$) in response to the roll parameters, and the lead time for application of the synthesized torque (T) so that the stabilizing torque is applied before the rider applied a steering torque. In one example the synthesized torque (T) may be applied as the stabilizing torque ($T_s$). In another example, the synthesized torque may be compared with a steering torque ($T_r$) and a stabilizing torque ($T_s$) to be applied may be determined based on the comparison.

Various examples and details regarding determination of synthesized torque and the stabilizing torque will be explained with reference to FIGS. 2, 3, 4a, and 4b in conjunction.

Figure 2:
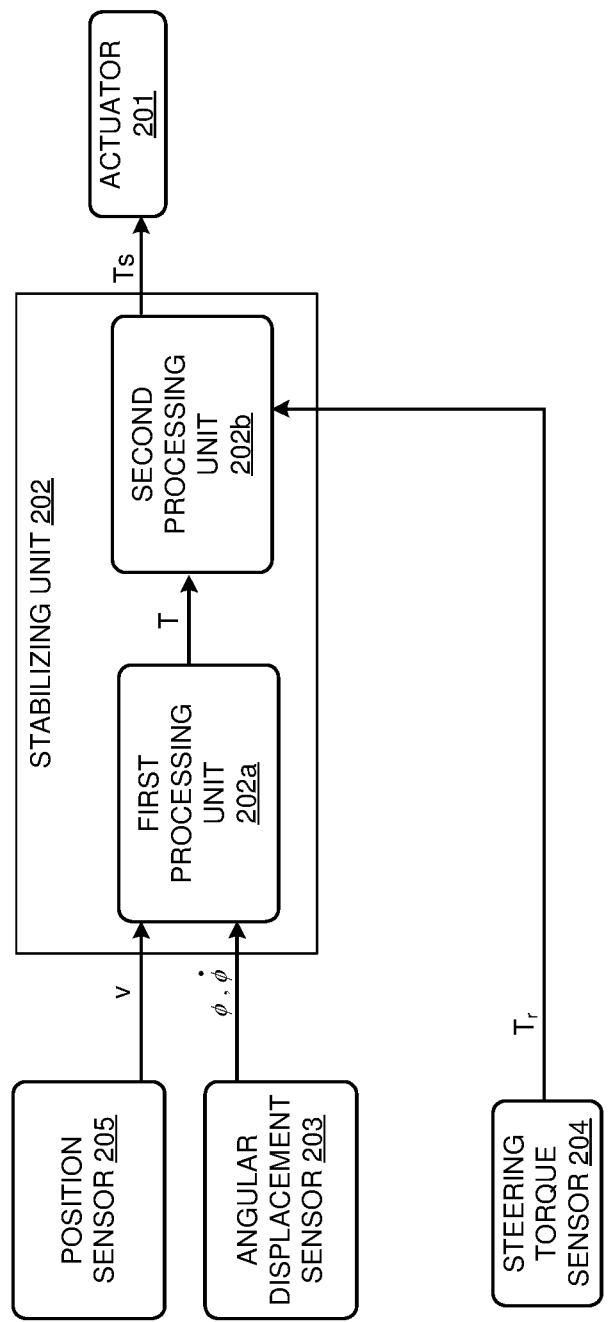
FIG. 2 illustrates a block diagram depicting parts of a system for vehicle stabilization, in accordance with an implementation of the present subject matter.

As depicted in FIG. 2, in one example, the stabilizing unit 202 may include a first processing unit 202a and a second processing unit 202b. The first and second processing units may be implemented as processors, microcontrollers, etc. The stabilizing unit 202 may also include one or more memories (not shown in the figure) associated with the first and second processing units. The first processing unit 202a may receive the vehicle speed, roll rate, and roll angle from the position sensor 205 and the angular displacement sensor 203 and may determine the synthesized torque (T).

Figure 3:
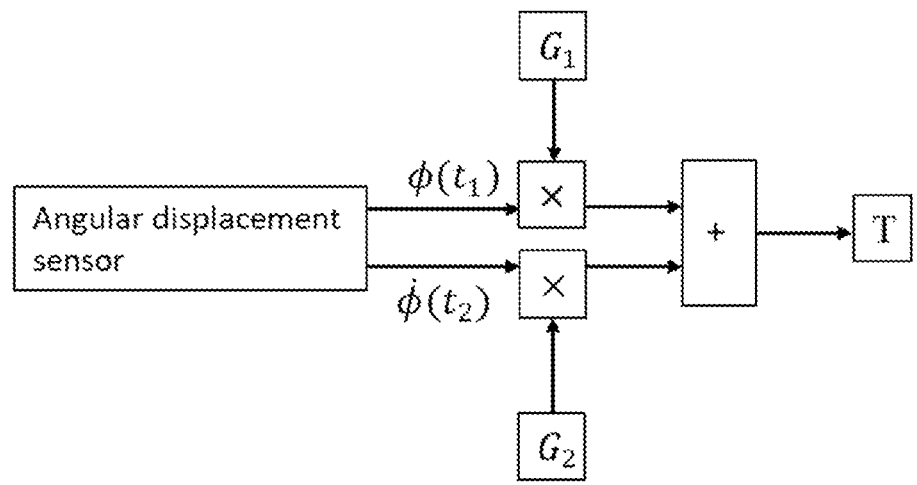
FIG. 3 illustrates a representation for torque calculation in accordance with an implementation of the present subject matter.
Figure 4A:
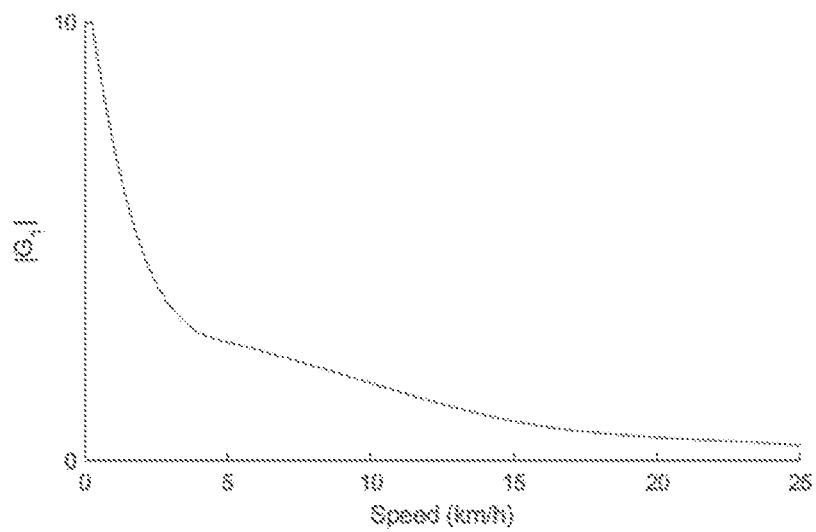
FIG. 4a illustrates a plot of first gain value vs vehicle speed.
Figure 4B:
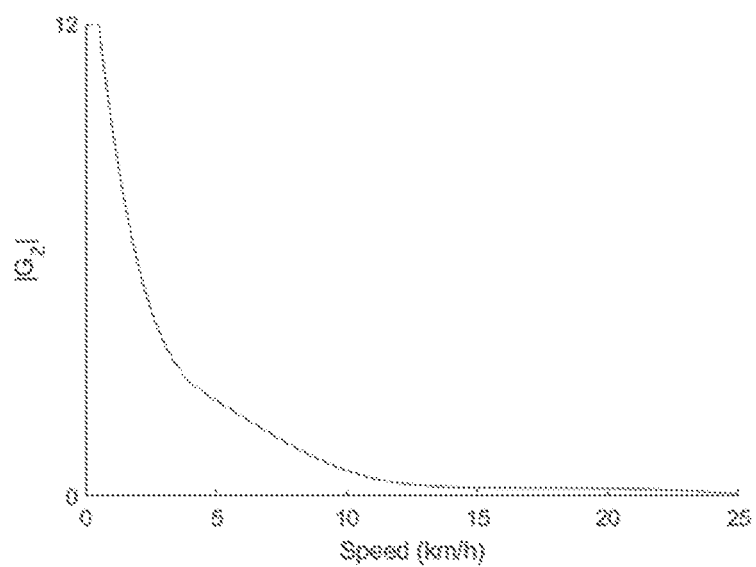
FIG. 4b illustrates a plot of second gain value vs vehicle speed.

In one example, as shown in FIG. 3, the synthesized torque (T) is determined by multiplying gain values $G_1$ and $G_2$ to the roll angle ($\phi$) and the roll rate ($\dot{\phi}$) respectively, and adding the products so determined. In order to ensure precise determination of the synthesized torque (T), corresponding delay time $dt_1$ and $dt_2$ is introduced in roll angle ($\phi$) and roll rate ($\dot{\phi}$) respectively, the delay times being determined with respect to steering torque ($T_r$) applied by rider. Thus time $t_1$ for computation of roll angle at time t is obtained as ($t_1 = t - dt_1$), where $dt_1$ is the roll angle delay time. Similarly, time $t_2$ for computation of roll rate at time t is obtained as ($t_2 = t - dt_2$) and $dt_2$ is the roll rate delay time.

The delay times account for the time difference by which the steering torque lags behind the roll angle ($\phi$) and roll rate ($\dot{\phi}$) and are measured in seconds. For example, in case of any manoeuvre at low speeds, when vehicle tends to roll due to instability, the rider may provide a steering torque ($T_r$) to balance, which results in balancing of the vehicle. As the steering torque is provided in response to the roll parameters, the steering torque will have a delay time in relation to roll angle ($\phi$) and roll rate ($\dot{\phi}$). Also, the delay times to be introduced for the two roll parameters will be different as the roll rate ($\dot{\phi}$) is a rate of change of roll angle ($\phi$) and therefore, the lag of the roll rate ($\dot{\phi}$) is different as compared to the lag of the roll angle ($\phi$). Moreover, the delay times may vary based on the speed of the vehicle, with the delay time being more for slower speeds.

In one example, the gain values $G_1$ and $G_2$ are obtained as a function of vehicle speed (v), vehicle specification, and delay times. In one example as may be seen in FIGS. 4a and 4b, the gain values $G_1$ and $G_2$ decrease non-linearly with increasing vehicle speed (v) and increase non-linearly with decreasing vehicle speed (v). As a result, a higher gain and thereby larger synthesized torque (T) is obtained at low vehicle speeds where the requirement for stabilization is more, while a smaller gain and thereby smaller synthesized torque (T) is obtained for higher speeds where the requirement for stabilization is lesser. In one example, the gain values $G_1$ and $G_2$ may be predetermined and stored in the memory of the stabilizing unit 202, for example, as a mapping table with the vehicle speed and delay times. In one example, the coefficient for determining gain values $G_1$ and $G_2$ may be predetermined based on regression analysis of experimental data for different vehicle speeds and delay times for different vehicle specifications. Thus, the gain values $G_1$ and $G_2$ may themselves be represented as a mathematical function and may be computed instantaneously.

In one example, the stabilizing unit 202 may determine a first synthesized torque ($T_1$) at a time t using the equation 1 shown below, for determining the synthesized torque (T).

$$T_1(t) = (C_1 v^3 + C_2 v^2 + C_3 v + C_4)\phi(t_1) + (C_5 v^3 + C_6 v^2 + C_7 v + C_8)\dot{\phi}(t_2) \quad \text{Eq. 1}$$

where, $$(C_1 v^3 + C_2 v^2 + C_3 v + C_4) = G_1$$

$$(C_5 v^3 + C_6 v^2 + C_7 v + C_8) = G_2$$

$$t_1 = (t - dt_1)$$

$$t_2 = (t - dt_2)$$

In one example, the first synthesized torque may be determined by the first processing unit 202a of the stabilizing unit 202 as shown in FIG. 2. In one example, the first processing unit 202a may include a gain adjuster block (not shown) which obtains and outputs the first synthesized torque ($T_1$) by adding products of gain values $G_1$, $G_2$ with roll angle $\phi(t_1)$ and roll rate $\dot{\phi}(t_2)$ respectively, the roll angle ($\phi$) and roll rate ($\dot{\phi}$) being detected by the angular displacement sensor 203. Further, the first processing unit 202a may also comprise a lead time calculation block (not shown) to determine a second synthesized torque ($T_2$) by applying a lead time ($\tau$) for the application of first synthesized torque ($T_1$) as shown in equation 2.

$$T_2(t)=T_1(t+\tau) \qquad \text{Eq. 2}$$

The lead time ($\tau$) is chosen such that the point of application of the balancing torque precedes a usual rider steering operation point to help in improving a rider's confidence level with the vehicle and reduce the amount of effort to be taken by the rider for balancing, even while being assisted for balancing especially at low vehicle speeds. In one example, the lead time ($\tau$) may be predetermined based on vehicle specifications and may be stored in the memory of the stabilizing unit 202.

The second processing unit 202b receives the synthesized torque (T) from the first processing unit 202a for comparison with a steering torque ($T_r$). In one example, the first synthesized torque ($T_1$) may be the synthesized torque (T) received by the second processing unit 202b for comparison with a steering torque ($T_r$). In another example, the second synthesized torque ($T_2$) may be the synthesized torque (T) received by the second processing unit 202b for comparison with a steering torque ($T_r$).

Further, the second processing unit 202b determines the stabilizing torque ($T_s$) based on a comparison of the synthesized torque (T) and steering torque ($T_r$) and provides an actuating signal to the actuator 201 to cause the actuator 201 to apply the stabilizing torque ($T_s$) on the steering handle. In one example, the second processing unit 202b may determine a product of the synthesized torque (T) with a tuning parameter, based on the comparison, for determining the stabilizing torque.

The value of correction coefficient/tuning parameter chosen may vary in the range of 0 to 1 depending on the different riding conditions as may be determined based on the steering torque ($T_r$). The stabilizing unit 202 typically encounters at least three different riding scenarios while comparing synthesized torque (T) with steering torque ($T_r$).

For example, in a first condition where a rider is not manoeuvring the vehicle 100 and the saddle riding type vehicle is in a straight running condition, the synthesized torque (T) calculated will be the same as the torque the rider tends to apply under a non-assisted riding condition, and thus the tuning parameter is chosen to be 1, i.e., the synthesized torque (T) is applied as the stabilizing torque ($T_s$) on the steering handle by the actuator 201. Therefore, the steering torque ($T_r$) to be applied by the rider is zero as the system 200 takes complete control over the vehicle by applying the stabilizing torque ($T_s$), which in this case will be equal to the synthesized torque (T). Typically, in straight running conditions the only need for a balancing torque is typically felt at low vehicle speeds. Since $G_1$ and $G_2$ are functions of vehicle speed, even at very low speeds, for example, below 7 kmph, the system 200 aids in automatically balancing the vehicle without requiring the rider to make steering corrections/apply steering torque to balance the vehicle. This is useful since at very low speeds the rider response in making quick steering adjustments/corrections is typically slow. It therefore improves the riding experience and safety at low speeds and while cruising.

In a second condition where the rider transiently manoeuvres the vehicle, for example during traffic conditions, or when he/she tries to evade a pothole or a road disturbance, the applied steering torque ($T_r$) at that instant will not be the same as the synthesized stabilizing torque ($T_1$) calculated by the stabilizing unit. Moreover, the rate of change of applied steering torque ($T_r$) will not be zero during transient manoeuvring, i.e. differential ($T_r$)≠0. In one example, the differential steering torque is determined based on a difference between the steering torque determined at a present instant and the steering torque determined at a just preceding instant. In one example, the signal corresponding to the roll parameters may have noises and may be filtered prior to processing. In this case, the differential may be determined from the filtered values of steering torque obtained for the previous and present instant of time. In one example, if the second condition is applicable, the stabilizing unit triggers the actuator to apply stabilizing torque A×T (i.e., product of values of tuning parameter A and T). The value of tuning parameter A depends on instantaneous values of roll angle ($\phi$) and roll rate ($\dot{\phi}$), and varies between 0 and 1 depending on the riding conditions. For example, after riding steadily for some distance with the assistance of the system 200 (i.e., with tuning parameter 1), when the rider manoeuvres transiently during a lane change or for evading a pothole, the value of tuning parameter (A) applied for computing stabilizing torque ($T_r$) will be reduced to close to 0 from 1, so as to allow the rider to apply the required torque for manoeuvring. The reduction in value of the first tuning parameter A to close to zero is made gradually so that the rider does not experience sudden discomfort of applying additional torque. Further, after the transient manoeuvre, when the rider continues to ride straight, i.e., the steering torque becomes zero or close to zero, the value of A is gradually increased to close to 1. Thus, smooth transition is made from providing assistance at straight running conditions to providing reduced assistance during transient manoeuvre and back to assisting during straight running. Use of the tuning parameter ensures that the rider has control over the vehicle while also ensuring that the vehicle does not lose balance. Thus, the present subject matter helps the rider feel that he has the control of the vehicle even while the vehicle is still being assisted by the system for balancing the vehicle. This is advantageous because the rider may tend to over steer or apply additional unnecessary torque if the system completely takes over the steering of the vehicle instead of reducing the assistance. The stabilizing unit is therefore configured to apply A≈0 momentarily when the rider makes a sudden manoeuvre, resulting in stabilizing torque (Ts) to be close to zero and allowing the rider to take over, while varying the tuning parameter's value between 0 to 1 along the manoeuvre.

In a third condition where the rider is steadily cornering, it is found that the applied steering torque ($T_r$) is approximately equal to synthesized torque (T), as the stabilizing unit determines the synthesized torque (T) based on roll angle ($\phi$) of the vehicle and there is a continuous roll that occurs during cornering. Further, the rate of change of applied steering torque ($T_r$) will be zero during steady cornering i.e. differential ($T_r$)≈0. In such conditions, the stabilizing unit 202 triggers the motor to apply stabilizing torque $T_s$=B×T, i.e., product of a second tuning parameter B and T. The stabilizing unit 202 is configured to select 'B' as the correction coefficient or tuning parameter required to be applied to the synthesized stabilizing torque (T) when the vehicle is being subjected to steady cornering. The value of tuning parameter B varies between 0 and 1. For example, as the rider starts cornering after steady riding, it may be first detected as a transient manoeuvre and the tuning parameter may be reduced to zero as discussed above. Further, as the steering torque remains constant as the rider continues cornering, it may be determined that the tuning parameter B is to be applied and the value of B is gradually increased to close to 1 when the rider continues the cornering so that stabilizing torque ($T_s$) becomes equal to B times that of the synthesized torque (T) and the rider has to apply minimal or no effort for the cornering, while B's value is maintained between zero to 1. Further, as the rider returns to a steady driving condition, the tuning parameter is maintained as 1 as discussed above for the first condition.

In one example, the tuning parameters to be used may be predetermined and stored in a memory in the stabilizing unit 202, for example, as a mapping table or a mathematical function. It will be understood that while in the discussion above it is stated that the tuning parameter is gradually varied (increased or decreased), the variation in the tuning parameter may be performed in a few milliseconds and the speed of variation may also depend on the vehicle speed.

In one example, the various coefficients/factors, such as gain, delay time, lead time, tuning parameter, etc. may be predetermined based on regression analysis of experimental data for different vehicle specifications and prestored in the memory of the stabilizing unit 202. In one example, the stabilization unit 202 may also implement machine learning to learn and fine tune the various coefficients as the vehicle is being driven for improved performance over time.

Thus, in various operational dynamic riding conditions, the vehicle balance is maintained, and assistance is provided by the system 200 efficiently with minimum parameters, resulting in improved rider experience.

Methods for stabilizing vehicles in accordance with the present subject matter will now be described with reference to FIGS. 5, 6, and 7 that illustrate methods 500, 600, and 700, respectively.

The order in which the methods 500-700 are described is not intended to be construed as a limitation, and some of the described method blocks may be combined in a different order to implement the methods or alternative methods. Furthermore, the methods may be implemented by processing resource(s) through any suitable hardware, non-transitory machine-readable instructions, or a combination thereof. It may be understood that steps of the methods may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. Further, although the methods 500-700 may be implemented in a variety of systems, the methods are described in relation to the system 200 and vehicle 100, for ease of explanation.

Figure 5:
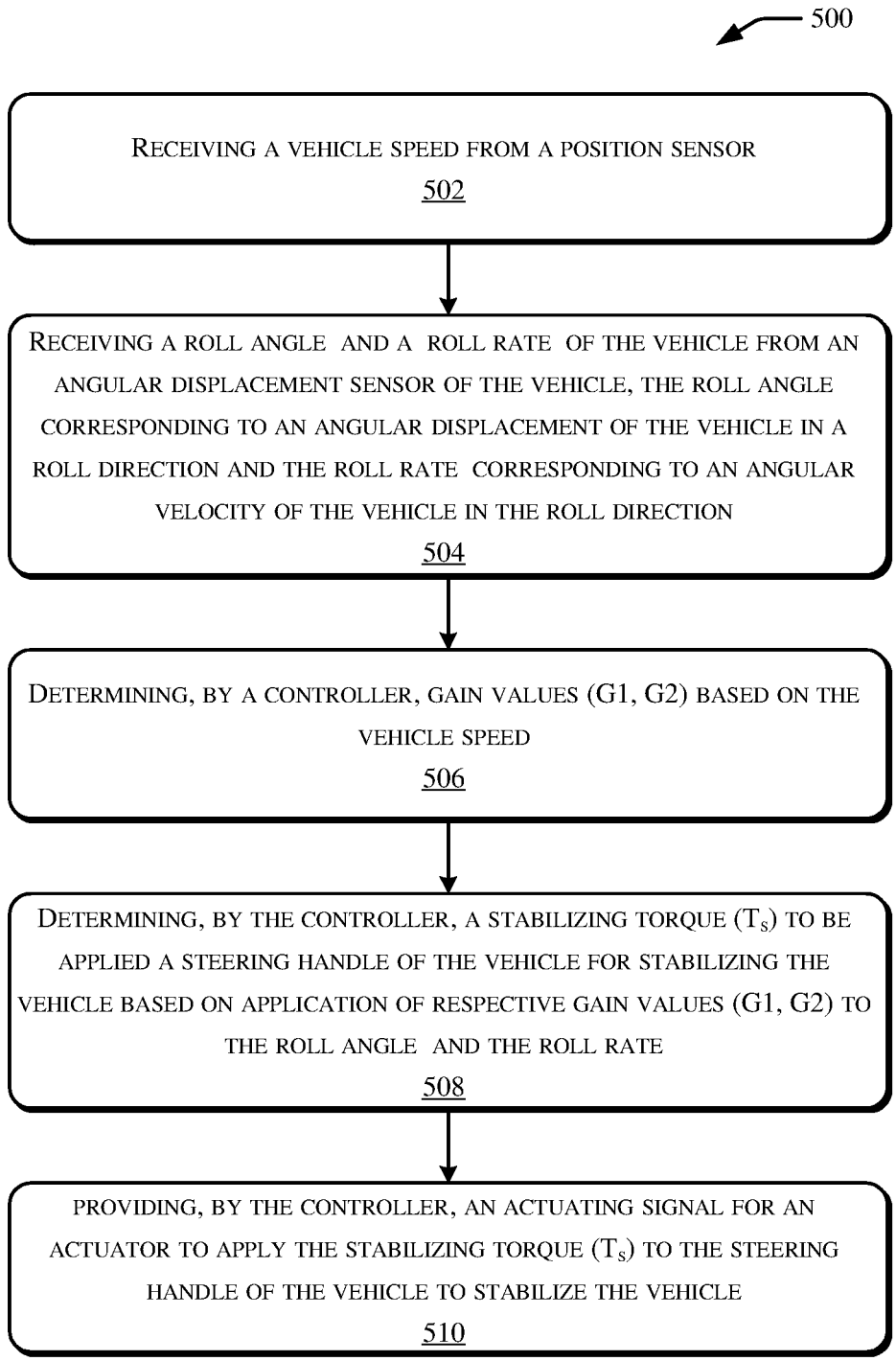
FIGS. 5, 6, and 7 illustrate methods for vehicle stabilization, in accordance with various implementations of the present subject matter.

Referring to FIG. 5 and method 500, at block 502, a vehicle speed (v) is received from a position sensor of the vehicle. For example, the stabilizing unit 202 receives the vehicle speed form the position sensor 205 of the vehicle 100.

At block 504, a roll angle ($\phi$) and a roll rate ($\dot{\phi}$) of the vehicle are received from an angular displacement sensor of the vehicle. The roll angle ($\phi$) corresponds to an angular displacement of the vehicle in a roll direction and the roll rate ($\dot{\phi}$) corresponds to an angular velocity of the vehicle in the roll direction. For example, the stabilizing unit 202 may receive the roll angle ($\phi$) and roll rate ($\dot{\phi}$) from the angular displacement sensor 203 of the vehicle 100.

At block 506, gain values ($G_1$, $G_2$) may be determined based on the vehicle speed (v) by a controller. For example, the stabilizing unit 202 may be the controller and may determine the gain values from a mapping table or a mathematical function stored in the memory or implemented as a hardware circuit.

At block 508, a stabilizing torque (Ts) to be applied to a steering handle of the vehicle for stabilizing the vehicle may be determined by the controller based on application of respective gain values ($G_1$, $G_2$) to the roll angle ($\phi$) and the roll rate ($\dot{\phi}$). For example, the stabilizing unit 202 may determine the stabilizing torque (Ts) based on the gain values. As discussed above, the first gain value ($G_1$) and the second gain value ($G_2$) increase non-linearly with a decrease in the vehicle speed (v) and decrease non-linearly with an increase in the vehicle speed (v). The gain values ($G_1$, $G_2$) may be functions of the vehicle speed (v), vehicle specification, roll angle delay time ($dt_1$), and roll rate delay time ($dt_2$).

In one example, to estimate the steering torque accurately, a respective delay time $dt_1$, $dt_2$ is introduced in roll angle and roll rate. If the delay time is changed, the gain values will also change because the gain values are calculated from the analysis of experimental measurements for a given first synthesized torque ($T_1$) based on equation 1.

In one example, the controller may determine a first synthesized torque ($T_1$) as a sum of a first product of the roll angle ($\phi$) and a first gain value ($G_1$) and a second product of the roll rate ($\dot{\phi}$) and a second gain value ($G_2$). Further, for determining the gain values ($G_1$, $G_2$), respective delay times ($dt_1$, $dt_2$) may be applied to the roll angle ($\phi$) and the roll rate ($\dot{\phi}$) to account for the delay in steering torque with respect to roll parameters. The first synthesized torque may be used for determining the stabilizing torque ($T_s$) in one example.

In one example, a second synthesized torque ($T_2$) may be determined based on the first synthesized torque ($T_1$) and a lead time ($\tau$), wherein the lead time is to allow application of the stabilizing torque ($T_s$) prior to a steering torque ($T_r$) applied to the steering handle. The second synthesized torque may be used for determining the stabilizing torque ($T_s$) in another example.

At block 510, an actuating signal is provided by the controller for an actuator to apply the stabilizing torque ($T_s$) to the steering handle of the vehicle to stabilize the vehicle. For example, the stabilizing unit 202 may provide the actuating signal to an actuator 201.

In one example, a steering torque ($T_r$) may also be considered for stabilizing the vehicle to account for different riding conditions as discussed with reference to FIG. 6.

Figure 6:
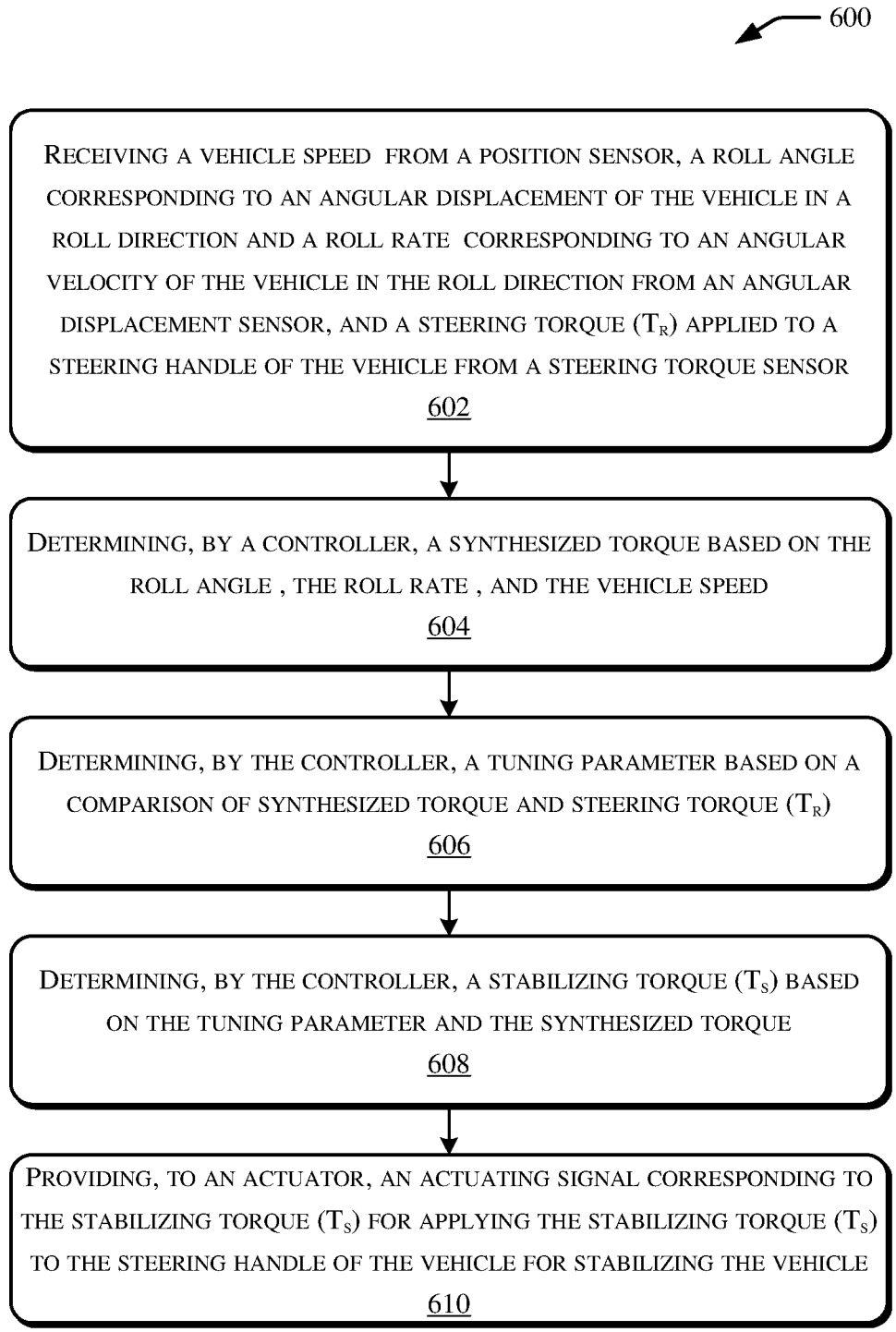

Referring to FIG. 6 and method 600, at block 602, a vehicle speed (v) is received from a position sensor, a roll angle ($\phi$) corresponding to an angular displacement of the vehicle in a roll direction and a roll rate ($\dot{\phi}$) corresponding to an angular velocity of the vehicle in the roll direction are received from an angular displacement sensor, and a steering torque ($T_r$) applied to a steering handle of the vehicle is received from a steering torque sensor. For example, the stabilizing unit 202 may receive the vehicle speed form position sensor 205, roll angle and roll rate from angular displacement sensor 203 and steering torque ($T_r$) from steering torque sensor 204.

At block 604, a synthesized torque (T) based on the roll angle ($\phi$), the roll rate ($\dot{\phi}$), and the vehicle speed (v) are determined by a controller. For example, the stabilizing unit 202 may be the controller and may determine the synthesized torque (T).

In one example, the synthesized torque (T) is determined by determining a first synthesized torque ($T_1$) as a sum of a first product of the roll angle ($\phi$) and a first gain value ($G_1$) and a second product of the roll rate ($\dot{\phi}$) and a second gain value ($G_1$). The first gain value ($G_1$) and the second gain value ($G_2$) increase non-linearly with a decrease in the vehicle speed (v) and decrease non-linearly with an increase in the vehicle speed (v). Further, respective delay times ($dt_1$, $dt_2$) are introduced into the roll angle ($\phi$) and the roll rate ($\dot{\phi}$) for determining the first synthesized torque ($T_1$) as discussed above. Further, a second synthesized torque ($T_2$) is determined based on the first synthesized torque ($T_1$) and a lead time ($\tau$), wherein the lead time is to allow application of the stabilizing torque ($T_s$) prior to a steering torque ($T_r$).

At block 606, a tuning parameter is determined by the controller based on a comparison of the synthesized torque (T) and the steering torque ($T_r$). The value of the tuning parameter may lie in the range of 0 to 1.

In one example, the tuning parameter is maintained as 1 when the steering torque is zero so that the stabilizing torque applied to the steering handle is equal to the synthesized torque when there is no steering torque applied to the steering handle. This corresponds to a steady driving condition of the vehicle where the rider may not be steering the vehicle.

In one example, the tuning parameter is varied gradually from 1 to 0 when the steering torque is not equal to the stabilizing torque and the steering torque varies with time so that the stabilizing torque applied to the steering handle is decreased from the synthesized torque to zero. Further, the tuning parameter is increased gradually from 0 to 1 when the steering torque becomes zero. This corresponds to a driving condition where a transient manoeuvring is performed from steady state riding and that returns back to the steady state after the transient manoeuvring.

In one example, the tuning parameter is varied gradually from 0 to 1 when the steering torque is equal to the stabilizing torque and the steering torque is constant with time so that the stabilizing torque applied to the steering handle is increased from zero to the synthesized torque. This corresponds to the steady cornering riding condition.

At block 608, a stabilizing torque ($T_s$) is determined by the controller based on the tuning parameter and the synthesized torque.

At block 610, an actuating signal corresponding to the stabilizing torque ($T_s$) is provided to an actuator for applying the stabilizing torque ($T_s$) to the steering handle of the vehicle for stabilizing the vehicle.

Figure 7:
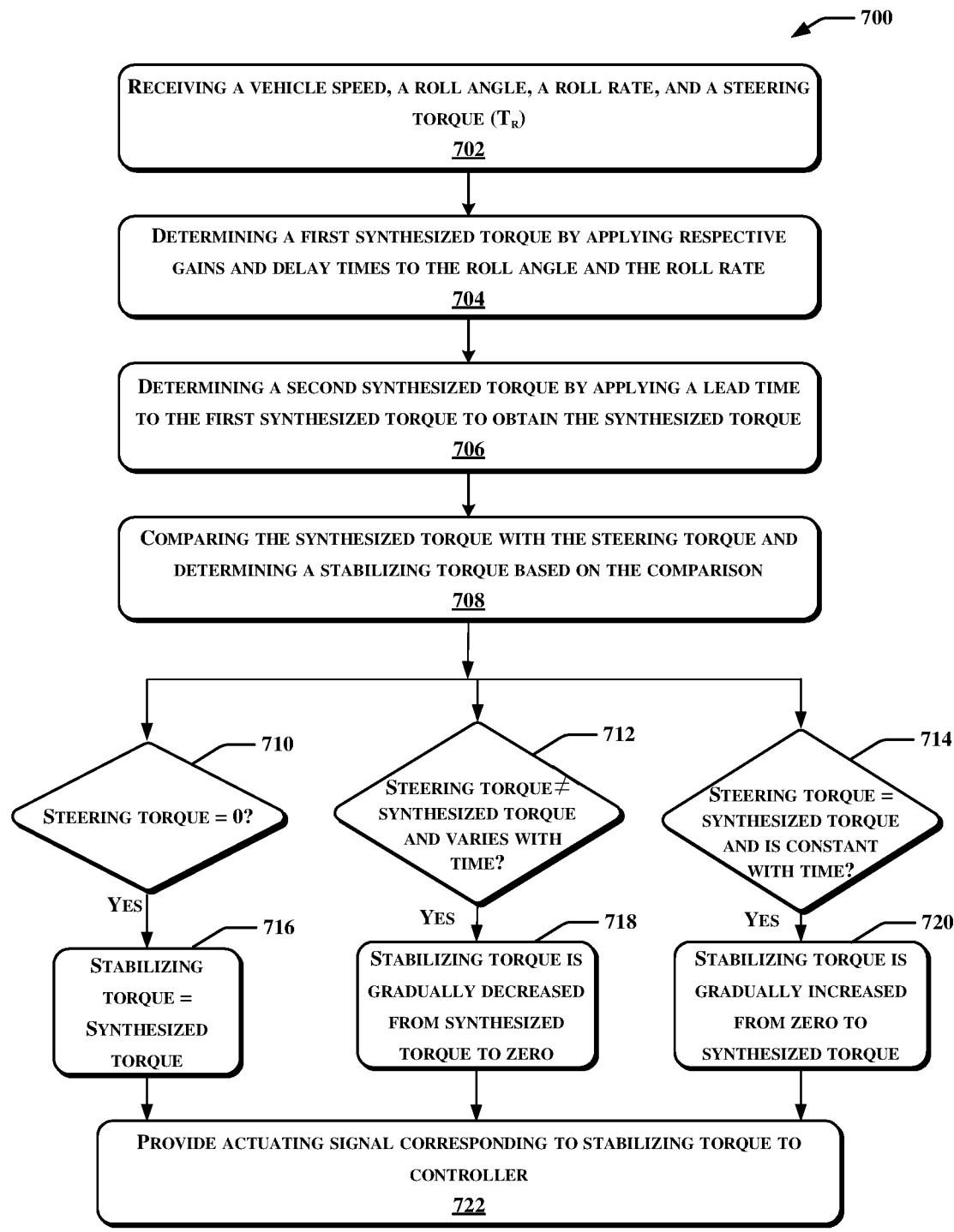

FIG. 7 illustrates a particular example method 700 for stabilizing vehicles. At block 702 a vehicle speed (v), a roll angle ($\phi$), a roll rate ($\dot{\phi}$), and a steering torque ($T_r$) are received, for example, by the stabilizing unit 202 from the plurality of sensors.

At block 704 a first synthesized torque ($T_1$) is determined by applying respective gains ($G_1$, $G_2$) and delay times ($dt_1$, $dt_2$) to the roll angle ($\phi$) and roll rate ($\dot{\phi}$). For example, the first synthesized torque may be determined using equation 1 discussed above.

At block 706, a second synthesized torque ($T_2$) is determined by applying a lead time ($\tau$) to the first synthesized torque ($T_1$) to obtain the synthesized torque (T). For example, the second synthesized torque may be determined using equation 2 discussed above. The second synthesized torque is used as the synthesized torque for determining a stabilizing torque.

At block 708, the synthesized torque (T) is compared with the steering torque ($T_r$) and a stabilizing torque ($T_s$) is determined based on the comparison. The three conditions possible on comparison are shown in blocks 710, 712, and 714. As the conditions may be evaluated in any order, they are shown as parallel branches arising from block 708 in the method 700.

At block 710, it is determined if steering torque ($T_r$) is zero and if yes, the stabilizing torque ($T_s$) is determined to be equal to the synthesized torque (T) at block 716 to help the rider in steady state driving/cruising.

At block 712 it is determined if the steering torque ($T_r$) is not equal to the synthesized torque (T) and if the steering torque ($T_r$) varies with time (i.e., differential of steering torque is not zero), and if yes, the stabilizing torque ($T_s$) is gradually decreased from the synthesized torque to zero at block 718 to allow the rider to take over for transient manoeuvring. In one example, a first tuning parameter may be multiplied with the synthesized torque (T) to obtain the stabilizing torque ($T_s$).

At block 714 it is determined if the steering torque ($T_r$) is equal to the synthesized torque (T) and if the steering torque ($T_r$) is constant with time (i.e., differential of steering torque is zero), and if yes, the stabilizing torque ($T_s$) is gradually increased from zero to the synthesized torque (T) at block 720 to assist in steady cornering. In one example, a second tuning parameter may be multiplied with the synthesized torque (T) to obtain the stabilizing torque ($T_s$).

Accordingly, the stabilizing torque ($T_s$) as determined from the block 716 or 718 or 720 is used to provide an actuating signal to the actuator, for example, motor actuator 201, at block 722 to apply the stabilizing torque on the steering handle of the vehicle.

Thus, the present subject matter aids in balancing the vehicle by pre-empting the rider in applying a stabilizing torque under various riding conditions, without interfering with steering intent of the rider. While the description has been detailed with reference to a rider, it will be understood that it is also applicable to rider-less vehicles that are automatically controlled and manoeuvred.

As may be appreciated from the foregoing discussions, the systems and methods as per the teachings of the present subject matter are not only capable of estimating stabilizing torque required for balancing the vehicle under different riding conditions but also capable of ensuring that the rider has effective control over the vehicle while the same is being balanced with assistance from the systems and methods. Moreover, the present subject matter uses a few easily determinable vehicle parameters such as vehicle speed, roll angle and roll rate, unlike other systems known in the art that use more complex inputs and computations. Also, the number of sensors required for the working of the present subject matter is reduced as compared to the complex prior art systems, thereby enabling in reducing the overall manufacturing and operating cost of the system.

Although implementations of the present subject matter have been described in language specific to structural features and/or methods, it is to be understood that the present subject matter is not necessarily limited to the specific features or methods described. Rather, the specific features and methods are disclosed and explained as example implementations.

We claim:

1. A system for stabilizing a vehicle, the system comprising:
a plurality of sensors that comprises a position sensor to determine a vehicle speed, an angular displacement sensor to determine a roll angle corresponding to an angular displacement of the vehicle in a roll direction and a roll rate corresponding to an angular velocity of the vehicle in the roll direction, and a steering torque sensor to determine a steering torque applied to a steering handle of the vehicle; and
a stabilizing unit coupled to the plurality of sensors, wherein
the stabilizing unit:
determines a synthesized torque based on the roll angle, the roll rate, and the vehicle speed;
determines a tuning parameter based on a comparison of the synthesized torque and the steering torque;
determines a stabilizing torque based on the tuning parameter and the synthesized torque; and
provides, to an actuator, an actuating signal corresponding to the stabilizing torque for applying the stabilizing torque to the steering handle of the vehicle for stabilizing the vehicle.

2. The system as claimed in claim 1, wherein the tuning parameter lies in a range of 0 to 1.

3. The system as claimed in claim 2, wherein the stabilizing unit maintains the tuning parameter as 1 when the steering torque is zero so that the stabilizing torque applied to the steering handle is equal to the synthesized torque when there is no steering torque applied to the steering handle.

4. The system as claimed in claim 2, wherein the stabilizing unit:
varies the tuning parameter gradually from 1 to 0 when the steering torque is not equal to the stabilizing torque and the steering torque varies with time so that the stabilizing torque applied to the steering handle is decreased from the synthesized torque to zero; and
increases the tuning parameter gradually from 0 to 1 when the steering torque becomes zero.

5. The system as claimed in claim 2, wherein the stabilizing unit:
varies the tuning parameter gradually from 0 to 1 when the steering torque is equal to the stabilizing torque and the steering torque is constant with time so that the stabilizing torque applied to the steering handle is increased from zero to the synthesized torque.

6. The system as claimed in claim 1, wherein, to determine the synthesized torque, the stabilizing unit determines a first synthesized torque as a sum of a first product of the roll angle and a first gain value and a second product of the roll rate and a second gain value, wherein the first gain value and the second gain value increase non-linearly with a decrease in the vehicle speed and decrease non-linearly with an increase in the vehicle speed.

7. The system as claimed in claim 6, wherein, to determine the synthesized torque, the stabilizing unit introduces respective delay times into the roll angle and the roll rate.

8. The system as claimed in claim 7, wherein, to determine the synthesized torque, the stabilizing unit determines a second synthesized torque based on the first synthesized torque and a lead time, wherein the lead time is to allow application of the stabilizing torque prior to a steering torque.

9. The system as claimed in claim 1, wherein the position sensor determines an instantaneous state of the vehicle.

10. The system as claimed in claim 1, wherein the stabilization unit comprises one or more controllers and one or more memories.

11. The system as claimed in claim 1, wherein the actuator is a motor and the actuating signal controls motor torque applied by the motor on the steering handle.

12. A vehicle comprising a steering handle, an actuator, and the system as claimed in claim 1.

13. A method for stabilizing a vehicle, the method comprising:
receiving a vehicle speed from a position sensor, a roll angle corresponding to an angular displacement of the vehicle in a roll direction and a roll rate corresponding to an angular velocity of the vehicle in the roll direction from an angular displacement sensor, and a steering torque applied to a steering handle of the vehicle from a steering torque sensor;
determining, by a controller, a synthesized torque based on the roll angle, the roll rate, and the vehicle speed;
determining, by the controller, a tuning parameter based on a comparison of the synthesized torque and the steering torque;
determining, by the controller, a stabilizing torque based on the tuning parameter and the synthesized torque; and
providing, to an actuator, an actuating signal corresponding to the stabilizing torque for applying the stabilizing torque to the steering handle of the vehicle for stabilizing the vehicle.

14. The method as claimed in claim 13, wherein the tuning parameter lies in a range of 0 to 1.

15. The method as claimed in claim 14, further comprising:
maintaining the tuning parameter as 1 when the steering torque is zero so that the stabilizing torque applied to the steering handle is equal to the synthesized torque when there is no steering torque applied to the steering handle.

16. The method as claimed in claim 14, further comprising:
varying the tuning parameter gradually from 1 to 0 when the steering torque is not equal to the stabilizing torque and the steering torque varies with time so that the stabilizing torque applied to the steering handle is decreased from the synthesized torque to zero; and
increasing the tuning parameter gradually from 0 to 1 when the steering torque becomes zero.

17. The method as claimed in claim 14, further comprising:
varying the tuning parameter gradually from 0 to 1 when the steering torque is equal to the stabilizing torque and the steering torque is constant with time so that the stabilizing torque applied to the steering handle is increased from zero to the synthesized torque.

18. The method as claimed in claim 13, wherein determining the synthesized torque comprises determining a first synthesized torque as a sum of a first product of the roll angle and a first gain value and a second product of the roll rate and a second gain value, wherein the first gain value and the second gain value increase non-linearly with a decrease in the vehicle speed and decrease non-linearly with an increase in the vehicle speed.

19. The method as claimed in claim 18, wherein determining the synthesized torque comprises introducing respective delay times into the roll angle and the roll rate.

20. The method as claimed in claim 19, wherein determining the synthesized torque comprises determining a second synthesized torque based on the first synthesized torque and a lead time, wherein the lead time is to allow application of the stabilizing torque prior to a steering torque.

21. A system for stabilizing a vehicle, the system comprising:
a plurality of sensors that comprises a position sensor to determine a vehicle speed and an angular displacement sensor to determine a roll angle and a roll rate of the vehicle, the roll angle corresponding to an angular displacement of the vehicle in a roll direction and the roll rate corresponding to an angular velocity of the vehicle in the roll direction; and
a stabilizing unit that provides an actuating signal to an actuator, the actuating signal corresponding to a stabilizing torque to be applied to a steering handle of the vehicle by the actuator for stabilizing the vehicle, wherein the stabilizing unit is coupled to the plurality of sensors, and wherein the stabilizing unit:
determines gain values respectively for the roll angle and the roll rate based on the vehicle speed; and
determines the stabilizing torque based on application of respective gain values to the roll angle and the roll rate.

22. The system as claimed in claim 21, wherein to determine the stabilizing torque, the stabilizing unit determines a first synthesized torque as a sum of a first product of the roll angle and a first gain value and a second product of the roll rate and a second gain value, wherein the first gain value and the second gain value increase non-linearly with a decrease in the vehicle speed and decrease non-linearly with an increase in the vehicle speed.

23. The system as claimed in claim 21, wherein, to determine the stabilizing torque, the stabilizing unit introduces respective delay times into the roll angle and the roll rate.

24. The system as claimed in claim 23, wherein the stabilizing unit:
determines a second synthesized torque based on the first synthesized torque and a lead time, wherein the lead time is to allow application of the stabilizing torque prior to a steering torque; and
determines the stabilizing torque based on the second synthesized torque.

25. The system as claimed in claim 21, wherein the gain values are functions of the vehicle speed, vehicle specification, roll angle delay time, and roll rate delay time.

26. The system as claimed in claim 21, wherein the position sensor determines an instantaneous state of the vehicle.

27. The system as claimed in claim 21, wherein the stabilization unit comprises one or more controllers and one or more memories.

28. The system as claimed in claim 21, wherein the actuator is a motor and the actuating signal controls motor torque applied by the motor on the steering handle.

29. A vehicle comprising a steering handle, an actuator, and the system as claimed in claim 21.

30. A method for stabilizing a vehicle, the method comprising:
receiving a vehicle speed from a position sensor of the vehicle;
receiving a roll angle and a roll rate of the vehicle from an angular displacement sensor of the vehicle, the roll angle corresponding to an angular displacement of the vehicle in a roll direction and the roll rate corresponding to an angular velocity of the vehicle in the roll direction;
determining, by a controller, gain values based on the vehicle speed;
determining, by the controller, a stabilizing torque to be applied a steering handle of the vehicle for stabilizing the vehicle based on application of respective gain values to the roll angle and the roll rate; and
providing, by the controller, an actuating signal for an actuator to apply the stabilizing torque to the steering handle of the vehicle to stabilize the vehicle.

31. The method as claimed in claim 30, wherein, to determine the stabilizing torque, the controller determines a first synthesized torque as a sum of a first product of the roll angle and a first gain value and a second product of the roll rate and a second gain value, wherein the first gain value and the second gain value increase non-linearly with a decrease in the vehicle speed and decrease non-linearly with an increase in the vehicle speed.

32. The method as claimed in claim 30, wherein determining the gain values comprises introducing respective delay times into the roll angle and the roll rate.

33. The method as claimed in claim 32, wherein determining the stabilizing torque comprises determining a second synthesized torque based on the first synthesized torque and a lead time, wherein the lead time is to allow application of the stabilizing torque prior to a steering torque applied to the steering handle.

34. The method as claimed in claim 30, wherein the gain values are functions of the vehicle speed, vehicle specification, roll angle delay time, and roll rate delay time.

* * * * *